Figure 1:
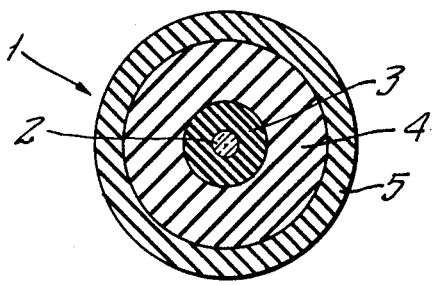

United States Patent [19]

Lombardi et al.

[11] 4,448,484

[45] May 15, 1984

[54] OPTICAL FIBER ELEMENT WITH THREE LAYER PROTECTIVE COVERING

[75] Inventors: Aurelio Lombardi, Monza; Elio Occhini, Milan, both of Italy

[73] Assignee: Societa Cavi Pirelli S.p.A., Milan, Italy

[21] Appl. No.: 364,187

[22] Filed: Mar. 31, 1982

[30] Foreign Application Priority Data

Apr. 2, 1981 [IT] Italy ................................ 20895 A/81

[51] Int. Cl.³ .................................................. G02B 5/14
[52] U.S. Cl. .................................................... 350/96.23
[58] Field of Search ........................................ 350/96.23

[56] References Cited

U.S. PATENT DOCUMENTS

| 4,185,887 | 1/1980 | Ferrentino | 350/96.23 |
| 4,231,635 | 11/1980 | Zeidler et al. | 350/96.23 |
| 4,331,378 | 5/1982 | Hartig | 350/96.23 |

*Primary Examiner*—John D. Lee
*Assistant Examiner*—Robert E. Wise
*Attorney, Agent, or Firm*—Brooks, Haidt, Haffner & Delahunty

[57] ABSTRACT

An optical fiber element comprising an optical fiber surrounded and protected from mechanical stresses by three layers of plastic material, the intermediate layer having a modulus of elasticity substantially less than the moduli of elasticity of the adjacent inner and outer layers and less than one Kilogram/mm².

12 Claims, 2 Drawing Figures

OPTICAL FIBER ELEMENT WITH THREE LAYER PROTECTIVE COVERING

The present invention relates to an optical fiber element to be used in telecommunication cables and, more particularly, it relates to an optical fiber element surrounded by three layers of a plastic material which closely surround and protect the optical fiber contained in the element.

As is known, one or more optical fibers can be used in electric cables as elements intended to transmit communication signals. See, for example, the cables described in the U.S. Pat. Nos. 3,937,559 and 4,153,332.

It is also well known that optical fibers are brittle, and as a consequence, it is necessary to provide appropriate coverings capable of absorbing the possible stresses to which said optical fibers could be subjected and which would seriously prejudice the behavior characteristics of the fibers.

In particular, when using an optical fiber closely surrounded, for its whole length, by plastomeric or elastomeric covering material, two types of stresses are likely to occur more frequently than in other cases, namely, mechanical and thermal stresses.

The mechanical stress can be originated by a force perpendicular to the longitudinal axis of the fiber, for instance, by the compression exerted on a certain portion of the fiber by the other elongated elements used in the cable and, in particular, by the presence of fibers stranded together and by the effects mutually exerted on the fibers when the cable is bent, either during its manufacture or during installation.

The thermal stress can be originated, for instance, by a contraction of the outermost layer of covering material, e.g. if this material reduces in length when subjected to thermal changes, with the consequence that, through its radially innermost parts, an axial load is applied to the fiber, with a possible unacceptable bending of the latter.

In general, one solution for reducing these stresses is that of providing a protective layer of a thermoplastic material having a modulus of elasticity capable of opposing to the bendings of the fiber. However, because of its high elasticity modulus, this material has a certain stiffness, so that it can transmit possible mechanical stresses of localized compression, for instance, squeezing on a certain longitudinal portion, from the outside towards the fiber. The compression is transmitted not in a uniform manner, but irregularly, i.e. with different pressures on a cross-section of the fiber rather than with a pressure equally distributed on the same.

To overcome this disadvantage, resort has been had to the use of a first covering layer, placed around the fiber and made of an elastomeric material, for example, silicone rubber, having a very low elasticity modulus in comparison with that of the outer layer, which, in many cases, is made of nylon.

In this latter construction, the amount of localized compression stress not absorbed by the outermost covering layer is transmitted to the innermost one. However, since the latter has a much lower stiffness, it tends to impart the stresses to the fiber in a uniform manner, loading it in an acceptable way.

This latter solution is also not quite satisfactory, since the innermost covering layer, which has a very low modulus of elasticity, permits a certain flexing of the fiber, so that the guarantee of a correct behavior of the fiber cannot be ensured because the flexing of the fiber can cause an attenuation of the signal.

The present invention has, as one object the providing of an optical fiber element devoid of the above-described disadvantages. In accordance with such object, the present invention provides an optical fiber element for communication signals used in a cable, characterized in that the element comprises, immediately around its periphery, at least three covering layers of plastomeric or elastomeric material having different moduli of elasticity, the intermediate layer having a modulus of elasticity lower than that of the adjacent layers and a value substantially smaller than 1 Kg/mm$^2$.

The optical fiber element of the invention has, around the optical fiber, a plastomeric or elastomeric covering comprising three separate plastic layers each having a deformability different from that of the others and arranged according to an unusual sequence, starting from the innermost layer towards the outermost one. In fact, as described hereinbefore, the layer having a modulus of elasticity lower than that of the others is the intermediate layer, and not the innermost one, as might have been expected if the gradual and ordered stiffness of the protective layers provided around the fiber has been followed in accordance with the prior art teachings.

The unusual sequence of the layers has permitted the obtaining of satisfactory results as regards the protection of the optical fiber against mechanical and thermal stresses. In fact, the function of appropriately resisting and withstanding the bending of the optical fiber originated by a shrinkage in the length of the unit arranged around the fiber due, for instance, to the contraction after extrusion of an outer layer made of nylon, can be ascribed to the innermost layer, owing to its modulus of elasticity, while the characteristic of transmitting uniformly towards the fiber the mechanical compression stresses coming from the outermost layer can be ascribed to the intermediate layer having the lowest elasticity modulus.

Preferably, the optical fiber element is characterized in that the ratio between the modulus of elasticity of the innermost covering layer and that of the intermediate layer is equal to, or higher than, 300.

Also, preferably, the optical fiber element is characterized in that the ratio between the modulus of elasticity of the outer layer and that of the intermediate layer is equal to, or higher than, 50.

According to a preferred embodiment, the optical fiber element is characterized in that the innermost layer is made of thermosetting resin.

Figure 2:
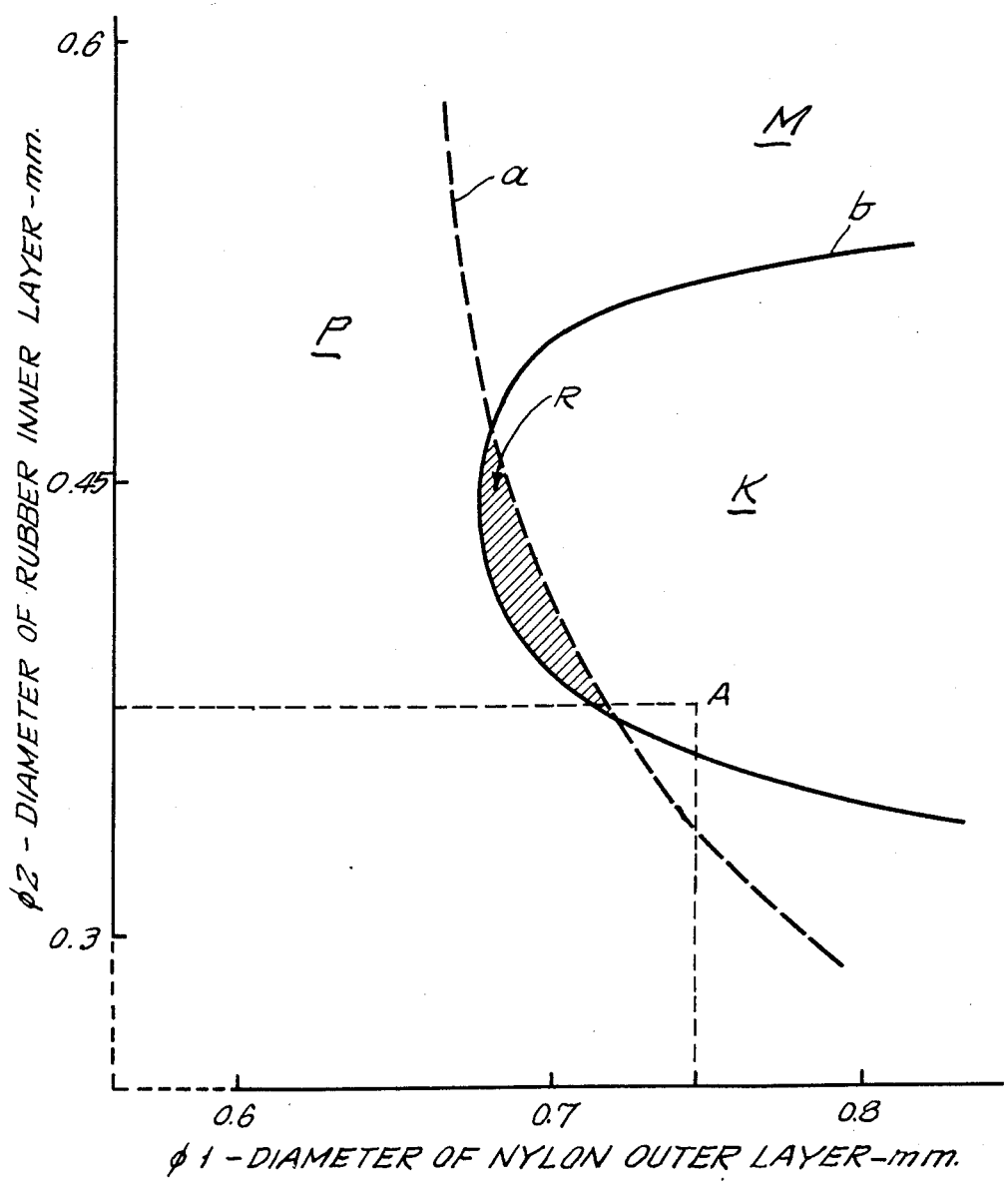

Other objects and advantages of the present invention will be apparent from the following detailed description of the presently preferred embodiments thereof, which description should be considered in conjunction with the accompanying drawings in which:

FIG. 1 shows a cross-section of an optical fiber element according to the invention; and FIG. 2 is a graph used to explain the principles of the invention.

In FIG. 1, the reference numeral 1 designates an elongated body constituted by an optical fiber 2 and by a plastomeric or elastomeric covering in which the fiber 2 is embedded for its whole length. The body 1 can be used as an individual element or may be used as one of the many elements, generally stranded together, which form a cable intended to transmit signals.

The protective covering consists of at least three plastomeric or elastomeric layers 3, 4, 5 having different moduli of elasticity. The modulus of elasticity of the first innermost layer 3 may range between 200 and 400 Kg/mm², the very low moddulus of elasticity of the second layer may range between 0.2 and 0.8–0.9 Kg/mm², while that of the third layer 5 may range from 40 Kg/mm² up to 200 or 300 Kg/mm².

It is preferable, for obtaining an adequate resistance of the fibers to the various stresses, to correlate in pre-established ratios the moduli of elasticity of the various covering layers. preferably, the numerical values of the different moduli should be selected in a particular manner.

In particular:

the ratio between the modulus of elasticity of the first, innermost layer 3 and that of the intermediate layer 4 should be equal to, or higher than, 300;

the ratio between the modulus of elasticity of the third, outer layer 5 and that of the intermediate layer 4 should be equal to, or higher than, 50.

As an example, the optical fiber may have a diameter of 0.12 mm, and the first covering layer 3, 0.2 mm in thickness, is made of a thermosetting resin, preferably an epoxy resin, having a modulus of elasticity of 200 Kg/mm². The second covering layer 4, 0.15 mm in thickness, is made of elastomeric material, conveniently, silicone rubber, having a modulus of elasticity far lower than that of the first layer 3, and generally ranging from 0.2 to 0.5 Kg/mm², e.g. 0.35 Kg/mm².

The third covering layer 5, which in some cases is the outermost protective layer, is made of a thermoplastic resin, in particular a polyamide resin, such as nylon, having a modulus of elasticity considerably higher than that of the second layer 4, e.g. 150 Kg/mm². The thickness of the nylon layer 5 may be 0.2 mm, and the final diameter of the unit is 1.22 mm.

According to other embodiments, the first layer 3 might be made of phenolic resins, the second layer 4 of acrylonitrile rubbers, the third layer 5 of polytetrafluoroethylene.

The process for covering a fiber is conventional. For example, it can be carried out by causing the continuous passage of the fiber through a first extruder, followed by a passage in a cross-linking medium for the formation of the first layer 3 of epoxy resin, and then followed by passage through two further extruders for the application of a layer of silicone rubber and then of a layer of nylon.

For a better understanding of the principles of the invention, reference will now be made to some considerations relating to the geometrical configuration of an optical fiber provided with two layers of plastic material, and then, a hypothesis will be formulated to explain the improvements obtained by means of the three layers of plastic material arranged about the fiber in accordance with the invention.

Initially consider an optical fiber provided with a first covering layer of silicone rubber having a modulus of elasticity of 0.35 Kg/mm², and with a second covering layer of nylon having a higher modulus of elasticity, approximately of 150 Kg/mm². In FIG. 2, the outer diameters of the two coverings are correlated, according to the different dimensions of the covering, by two curves a and b, curve a representing the axial loads on the fiber and curve b the radial loads.

The two curves are drawn with respect to cartesian axes whose abscissae indicate the diameters $\Phi 1$ of nylon and whose ordinates indicate the diameters $\Phi 2$ of silicone rubber. Of course, said curves a and b are merely illustrative and are drawn only in a qualitative way.

In particular, curve a is based on the hypothesis of different dimensions of the coverings surrounding the fiber and is obtained on the basis of the theory relating to a combined bending and compressive stress acting on a rod (to which the fiber is similar) and on the basis of the maximum admissible stress of said type for each dimension. In turn, curve b is based on the hypothesis of a uniformly distributed fictitious load, having a certain value and acting on a longitudinal portion of the outermost layer.

Curve a defines two separate areas, a first area P, at the left of the curve a, showing that the covering diameters are acceptable, and a second area M, at its right, where they are not acceptable, as would happen, for instance, for diameters of the layers of nylon and silicone rubber indicated by point A.

Curve b correlates the values of the diameters of the two coverings, so that the compression stress due, for instance to other fibers stranded together, is transmitted on the optical fiber, through the covering layers, in a still admissible way. Zone K, inside curve b, represents the acceptability area.

As one can see from the graphs of FIG. 2, the two curves a and b intersect each other and enclose a zone R, hatched in the drawing, which is very narrow. In practice, it can be seen that the diameters of the nylon layer or silicone rubber layer, which do not cause prejudical conditions for the fiber, are very few so that, in designing the fiber covering and because of the small difference between acceptable and unacceptable values of the diameters, there is the risk of exceeding the acceptable limits.

The problem of widening zone R, with the view of providing greater safety margins in determining the diameters of layers 4, 5 has been solved by means of the triple covering according to the present invention, which is obtained with a quite unusual and irregular sequence of the layers, i.e. with a first layer, having a certain stiffness, considerably higher than that of the intermediate layer.

It has been found that the best mechanical protection of the fiber against squeezing can be obtained by adopting greater and greater diameters and thicknesses of the outermost layer made of nylon without giving rise, because of a greater contraction of nylon with shrinkage after extrusion, to axial loads unacceptable for the fiber. Consequently, it can be reasonably assumed that the integrity of the fiber is maintained by virtue of the presence of the layer of epoxy resin immediately adjacent to it, and this results because, in the known limits of the considered phenomenon, the modulus of elasticity of said resin is sufficiently high to provide in the layer a resistant "jacket" tending to withstand the bending of the fiber. Moreover, the greater thickness of the nylon layer cooperates in ensuring the integrity of the fiber subjected to radial load.

Therefore, it can be said that the introduction of the thermosetting resin according to the invention corresponds to a displacement of curve a of FIG. 2 towards the right and of curve b towards the left, increasing consequently, in a relevant manner, the area R which indicates the acceptable diameters of layers 4 and 5.

The presence of the intermediate layer 4 between layers 5 and 3 provides a space in which a large amount of the compression forces acting on the outermost layer 5 which are not absorbed by layer 5 are transmitted, almost hydrostatically, because of the low modulus of elasticity of silicone rubber.

Thus, the forces are transmitted with a uniformly distributed pressure, all around the layer 3 of epoxy resin, and therefore, around the fiber 2.

Although preferred embodiments of the present invention have been described and illustrated, it will be apparent to those skilled in the art that various modifications may be made without departing from the principles of the invention.

What is claimed is:

1. An optical fiber element for a communication cable comprising an optical fiber and three layers of plastomeric or elastomeric material surrounding said fiber along its length, a first one of said layers surrounding and being in contact with said fiber, a second one of said layers surrounding and being in contact with said first layer and a third one of said layers surrounding and being in contact with said second layer and said second layer having a modulus of elasticity less than the modulus of elasticity of said first layer and said third layer and having a modulus of elasticity less than one Kilogram per mm$^2$.

2. An optical fiber element as set forth in claim 1 wherein the ratio of the modulus of elasticity of said first layer to the modulus of elasticity of said second layer is at least 300.

3. An optical fiber element as set forth in claim 2 wherein said first layer is made of a thermosetting resin and wherein the ratio of the modulus of elasticity of said third layer to the modulus of elasticity of said second layer is at least 50.

4. An optical fiber element as set forth in claim 3 wherein said thermosetting resin is an epoxy resin.

5. An optical fiber element as set forth in claim 1 or 2 wherein the ratio of the modulus of elasticity of said third layer to the modulus of elasticity of said second layer is at least 50.

6. An optical fiber element as set forth in claim 1 or 2 wherein said first layer is made of a thermosetting resin.

7. An optical fiber element as set forth in claim 6 wherein said resin is an epoxy resin.

8. An optical fiber element as set forth in claim 1 or 2 wherein said second layer is made of an elastomeric resin.

9. An optical fiber element as set forth in claim 8 wherein said resin is silicone rubber.

10. An optical fiber element as set forth in claim 1 or 2 wherein said third layer is made of a thermoplastic resin.

11. An optical fiber element as set forth in claim 10 wherein said resin is nylon.

12. A cable comprising a plurality of elements, at least one of said elements being the optical fiber of claim 1 or 2.

* * * * *